US012615632B2

(12) United States Patent
Matsumura et al.

(10) Patent No.: US 12,615,632 B2
(45) Date of Patent: Apr. 28, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 288 days.

(21) Appl. No.: 18/551,069

(22) PCT Filed: Mar. 19, 2021

(86) PCT No.: PCT/JP2021/011443
§ 371 (c)(1),
(2) Date: Sep. 18, 2023

(87) PCT Pub. No.: WO2022/195861
PCT Pub. Date: Sep. 22, 2022

(65) Prior Publication Data
US 2024/0172215 A1     May 23, 2024

(51) Int. Cl.
*H04W 72/1263*     (2023.01)

(52) U.S. Cl.
CPC .............................. *H04W 72/1263* (2013.01)

(58) Field of Classification Search
CPC ......... H04W 72/1263; H04W 72/0453; H04W 72/23; H04W 72/0446
USPC ......................................................... 370/329
See application file for complete search history.

(56) References Cited

U.S. PATENT DOCUMENTS

| | | | | |
|---|---|---|---|---|
| 11,864,232 B2 * | 1/2024 | Moon | .................... | H04L 5/0092 |
| 11,943,772 B2 * | 3/2024 | Obregon | .............. | H04W 74/02 |
| 12,068,861 B2 * | 8/2024 | Zhang | .................... | H04L 5/0053 |
| 12,082,201 B2 * | 9/2024 | Yi | .......................... | H04W 72/23 |
| 12,133,258 B2 * | 10/2024 | Chande | ............. | H04W 74/0816 |

(Continued)

FOREIGN PATENT DOCUMENTS

| | | | | | |
|---|---|---|---|---|---|
| CN | 111356242 A | * | 6/2020 | ........... | H04W 72/23 |
| WO | WO-2020100787 A1 | * | 5/2020 | ........... | H04W 72/23 |
| WO | WO-2021071343 A1 | * | 4/2021 | ........... | H04L 5/1469 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Mahendra R Patel
(74) *Attorney, Agent, or Firm* — Osha Bergman Watanabe & Burton LLP

(57)     ABSTRACT
A terminal according to one aspect of the present disclosure includes: a receiving section that receives information related to at least one of a schedule of an uplink (UL) channel and a schedule of a downlink (DL) channel; and a control section that controls at least one of transmission of the UL channel in a UL resource and reception of the DL channel in a DL resource, based on a structure of a period in which the UL resource and the DL resource are allowed to be configured in a same time domain and the information. According to one aspect of the present disclosure, resource usage efficiency can be increased.

5 Claims, 11 Drawing Sheets

(56) References Cited

U.S. PATENT DOCUMENTS

| 12,137,459 | B2 * | 11/2024 | Noh | H04L 5/0044 |
| 12,225,582 | B2 * | 2/2025 | Talarico | H04W 74/004 |
| 2017/0347351 | A1 * | 11/2017 | Cai | H04W 72/1263 |
| 2020/0146064 | A1 * | 5/2020 | Oh | H04W 74/0808 |
| 2021/0050955 | A1 * | 2/2021 | Park | H04B 7/0456 |
| 2021/0168849 | A1 * | 6/2021 | Oh | H04W 72/23 |
| 2021/0410119 | A1 * | 12/2021 | Takeda | H04W 72/23 |
| 2022/0240289 | A1 * | 7/2022 | Karaki | H04L 1/1896 |
| 2023/0056799 | A1 * | 2/2023 | Kim | H04L 5/0069 |

OTHER PUBLICATIONS

International Search Report issued in corresponding International Application No. PCT/JP2021/011443, mailed on Nov. 2, 2021 (5 pages).
Written Opinion issued in corresponding International Application No. PCT/JP2021/011443, mailed on Nov. 2, 2021 (4 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is assumed that a plurality of user terminals (User Equipments (UEs)) perform communication in ultra-high density and high traffic environment.

In such environment, lack of uplink (UL) resources compared with downlink (DL) resources is assumed.

However, for previous NR specifications, sufficient study has not been performed for a method of increasing uplink resources. Unless the method is appropriately controlled, deterioration of system performance, such as decrease of throughput, may occur.

Thus, an object of the present disclosure is to provide a terminal, a radio communication method, and a base station that increase resource usage efficiency.

Solution to Problem

A terminal according to one aspect of the present disclosure includes: a receiving section that receives information related to at least one of a schedule of an uplink (UL) channel and a schedule of a downlink (DL) channel; and a control section that controls at least one of transmission of the UL channel in a UL resource and reception of the DL channel in a DL resource, based on a structure of a period in which the UL resource and the DL resource are allowed to be configured in a same time domain and the information.

Advantageous Effects of Invention

According to one aspect of the present disclosure, resource usage efficiency can be increased.

DESCRIPTION OF EMBODIMENTS

TDD Configuration

Figures 1A, 1B, 1C:
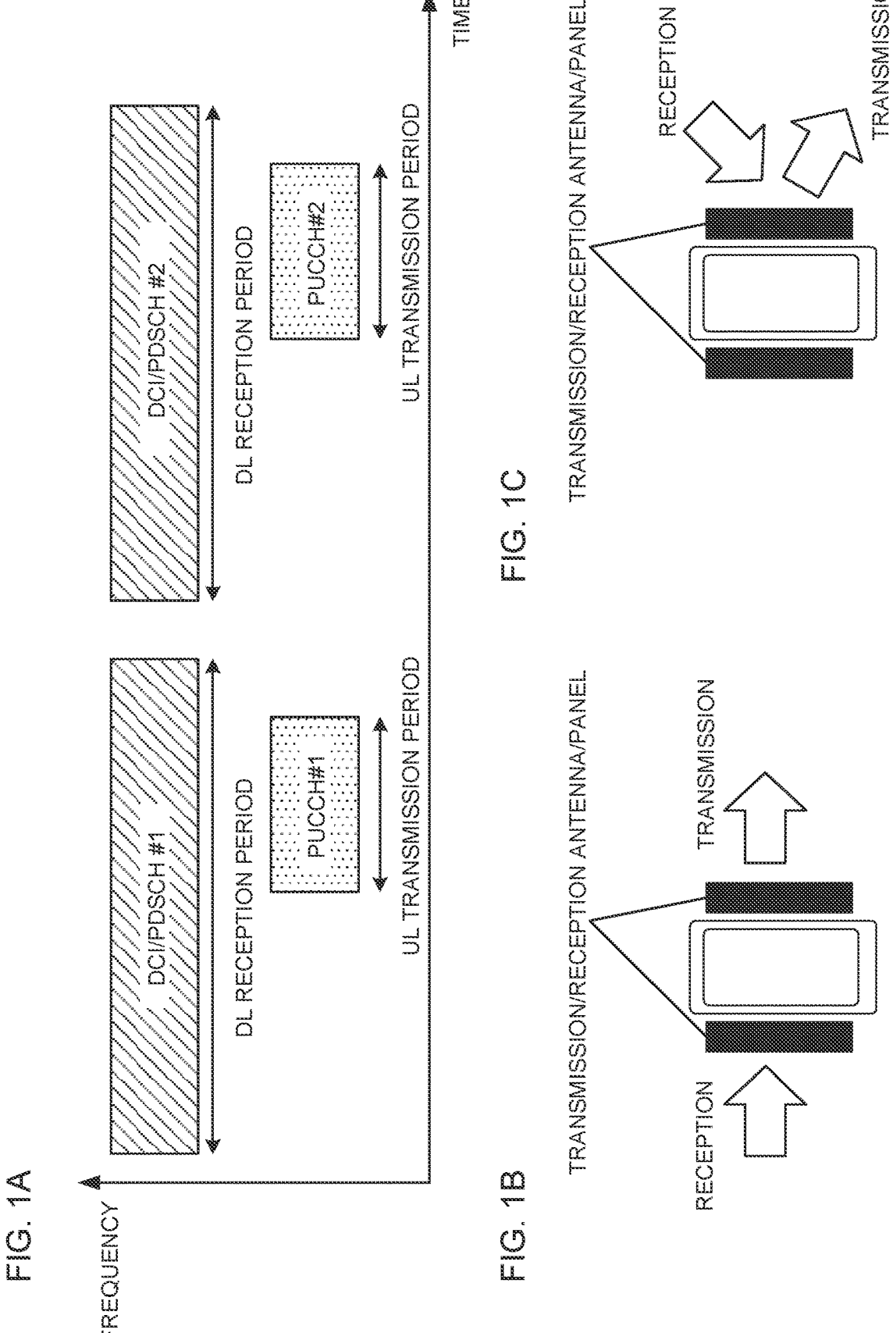
FIGS. 1A to 1C are diagrams to show examples of reception of a DL signal/channel and transmission of a UL signal/channel.

In Rel. 15, UL and DL (UL resource and DL resource) configuration in time division duplex (TDD) is performed for a UE. The UE may receive a higher layer parameter (TDD-UL-DL-ConfigCommon) related to a cell-specific UL/DL TDD configuration or a higher layer parameter (TDD-UL-DL-ConfigDedicated) related to a UE-specific UL/DL TDD configuration.

The higher layer parameter (TDD-UL-DL-ConfigCommon) related to the cell-specific UL/DL TDD configuration includes a parameter (referenceSubcarrierSpacing) for configuring a reference subcarrier spacing and a parameter (TDD-UL-DL-Pattern) related to TDD UL and DL pattern.

TDD-UL-DL-Pattern includes a parameter (dl-UL-TransmissionPeriodicity) for configuring periodicity of the DL-UL pattern, a parameter (nrofDownlinkSlots) for configuring the number of consecutive DL slots, a parameter (nrofDownlinkSymbols) for configuring the number of consecutive DL symbols, a parameter (nrofUplinkSlots) for configuring the number of consecutive UL slots, and a parameter (nrofUplinkSymbols) for configuring the number of consecutive UL symbols.

The higher layer parameter (TDD-UL-DL-ConfigDedicated) related to the UE-specific UL/DL TDD configuration is used to perform slot configuration and slot index configuration.

The slot configuration is performed by the parameter TDD-UL-DL-SlotConfig. TDD-UL-DL-SlotConfig includes a parameter (TDD-UL-DL-SlotIndex) related to a slot index and a parameter (symbols) related to symbols constituting a slot. The parameter (symbols) related to the symbols constituting the slot configures any of a parameter (allDownlink) indicating that all the symbols constituting the slot are used for DL, a parameter (allUplink) indicating that all the symbols constituting the slot are used for UL, and a parameter (explicit) explicitly indicating the number of symbols.

The parameter (explicit) explicitly indicating the number of symbols includes a parameter (nrofDownlinkSymbols) for configuring the number of DL symbols and a parameter (nrofUplinkSymbols) for configuring the number of UL symbols.

The UE determines a slot/symbol to be used for at least one of transmission of a UL signal/channel and reception of a DL signal/channel, based on the above-described parameters.

<Simultaneous Transmission and Reception by UE>

By taking account of a time ratio between transmission and reception (for example, DL:UL=4:1) by time division duplex (TDD) in Rel. 16 or previous versions, such a case is conceivable that UL signal/channel transmission occasions are fewer than DL signal/channel reception occasions. In such a case, a UE cannot perform frequent UL signal/channel transmission in Rel. 17 or later versions, and occurrence of delay in important UL signal/channel transmission is concerned. Since UL transmission occasions are fewer than DL reception occasions, signal/channel congestion in UL transmission occasions is also concerned.

In view of these, for Rel. 17 or later versions, it is studied that a UE performs transmission of an uplink (UL) signal/channel and reception of a downlink (DL) signal/channel in resources in resources at least partially overlapping in terms of time. In the present disclosure, the UE performing transmission of an uplink (UL) signal/channel and reception of a downlink (DL) signal/channel in resources at least partially overlapping in terms of time may be referred to as simultaneous transmission and reception by the UE. Note that, in the present disclosure, transmission of a UL signal/channel may simply be referred to as UL transmission, and reception of a DL signal/channel may simply be referred to as DL reception.

For example, it is conceivable that a UE that has reported, to a network (NW (for example, a base station)), whether to be capable of performing simultaneous transmission and reception by UE capability information/signaling (for example, full duplex UE capability) performs simultaneous transmission and reception. In contrast, a UE not capable of performing simultaneous transmission and reception does not perform reception/measurement of a DL signal/channel at the time of transmission of a UL signal/channel. In addition, the UE not capable of performing simultaneous transmission and reception does not perform transmission of a UL signal/channel at the time of reception/measurement of a DL signal/channel.

FIG. 1A is a diagram to show an example of reception of a DL signal/channel and transmission of a UL signal/channel. The example shown in FIG. 1A shows an example of reception of DCI/PDSCH and transmission of a PUCCH (HARQ-ACK) for the PDSCH. The UE receives DCI/PDSCH #1 in DL reception period #1 and transmits an HARQ-ACK for DCI/PDSCH #1 on PUCCH #1 in UL transmission period #1. The UE receives DCI/PDSCH #2 in DL reception period #2 and transmits an HARQ-ACK for DCI/PDSCH #2 on PUCCH #2 in UL transmission period #2. A gap (which may be referred to as a timing advance (TA) gap and the like) determined in consideration of the physical location of the UE may be configured each of between DL reception period #1 and UL transmission period #1 and between DL reception period #2 and UL transmission period #2.

FIGS. 1B and 1C are diagrams to show other examples of reception of a DL signal/channel and transmission of a UL signal/channel. The UE may perform reception of a DL signal/channel and transmission of a UL signal/channel in overlapping time resources (may perform simultaneous transmission and reception) by using a common transmission/reception panel/antenna/beam (see FIG. 1B). The UE may perform reception of a DL signal/channel and transmission of a UL signal/channel in overlapping time resources (may perform simultaneous transmission and reception) by using different transmission/reception panels/antennas/beams (see FIG. 1C).

When simultaneous transmission and reception of UL and DL are configurable, this not only improves delay of a UL signal/channel (for example, HARQ delay) but also UL coverage improvement is expected.

Energy used for UL transmission is a time integration value of UL transmission power (port). For example, when UL transmission is performed with the same power for double transmission time, this requires double transmission energy. When transmission energy is doubled, coverage (required SNR (Signal to Noise Ratio)) improves by approximately 3 dB.

Meanwhile, as described above, in the time division duplex (TDD) configuration defined in Rel. 16 or previous versions, DL traffic is higher than UL traffic (for example, DL:UL=4:1), and the number of slots used for UL (UL slots) is smaller than the number of slots used for DL (DL slots). To sufficiently ensure energy to be used for UL transmission in this situation, it is necessary to perform repetition transmission in a plurality of UL slots apart from each other in terms of time, for example. This is not desirable from a viewpoint of delay of UL signals/channels.

Figures 2A, 2B:
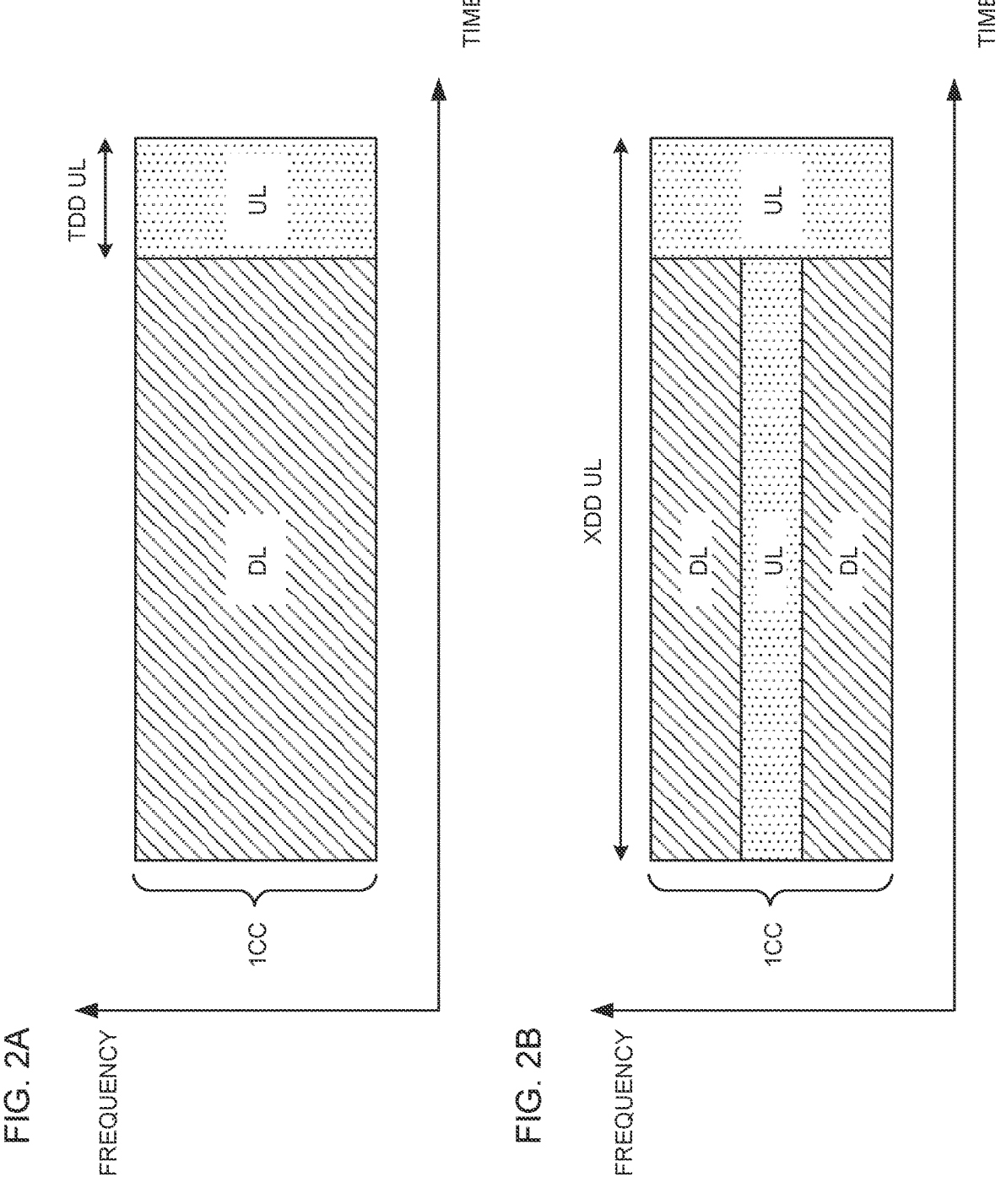
FIGS. 2A and 2B are diagrams to show examples of a configuration of a slot structure.

FIG. 2A is a diagram to show an example of a TDD configuration defined in Rel. 16 or previous versions. In the example illustrated in FIG. 2A, TDD slot/symbol configuration is performed for the UE in the bandwidth of one component carrier (CC) (which may be referred to as a cell or a serving cell). In the example shown in FIG. 2A, the time ratio between DL slots and UL slots is 4:1. In such a known slot/symbol configuration in TDD, UL slots may not sufficiently be ensured, and hence resource usage efficiency may decrease.

Thus, the inventors of the present invention came up with the idea of a method of flexibly allocating UL resources to a UE. More specifically, the inventors of the present invention came up with the idea of a structure in which a period used for DL reception and a period used for UL transmission overlap in terms of time as that shown in the example in FIG. 2B and a method of configuring such a structure. By defining the structure in which a period used for DL reception and a period used for UL transmission overlap in terms of time as that shown in FIG. 2B, UL resources can be ensured, and resource usage efficiency can be improved.

Note that, in the present disclosure, a unit expressing a period used for DL reception/UL transmission may be a slot, a symbol, or any time period. In the present disclosure, a slot, a sub-slot, a mini-slot, a symbol, a frame, a subframe, and a transmission unit time may be interchangeably interpreted or may simply be referred to as a "duration."

In the present disclosure, an NW (base station) may be capable of simultaneously transmitting and receiving DL and UL. The UE may be capable of simultaneously transmitting and receiving DL and UL but need not be capable of simultaneously transmitting and receiving DL and UL.

When the UE is not capable of simultaneously transmitting and receiving DL and UL, it is also conceivable to dynamically control/stop reception of a DL signal/channel according to scheduling of a UL signal/channel. However, dynamic control/stop of reception of a DL signal/channel may increase complexity of the UE.

Thus, the inventors of the present invention came up with the idea of a method of configuring/controlling DL/UL resources that can solve the above-described problem.

Embodiments according to the present disclosure will be described in detail with reference to the drawings as follows. The radio communication methods according to respective embodiments may each be employed individually, or may be employed in combination.

(Radio Communication Method)

A DL signal/channel in the present disclosure may be transmitted by using multicast/broadcast to a plurality of UEs or may be transmitted by using unicast. Configuration of the multicast/broadcast/unicast may be performed by using higher layer signaling.

In the present disclosure, A/B may mean at least one of A and B. In the present disclosure, "A/B/C" may mean "at least one of A, B, and C."

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

Physical layer signaling may be, for example, downlink control information (DCI).

Note that, in the present disclosure, a port, an antenna, an antenna port, a panel, a beam, an Uplink (UL) transmission entity, a transmission/reception point (TRP), spatial relation information, a spatial relation, a state of transmission configuration indication (TCI) (or Transmission Configuration Indicator) (TCI state (TCI-state)), quasi-co-location (QCL) assumption, a control resource set (CORESET), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group, a panel group, a beam group, a spatial relation group, a PUCCH group), and a CORESET pool may be interchangeably interpreted.

In the present disclosure, reception of a DL signal/channel and transmission of a UL signal/channel may be transmitted and received by using the same bandwidth part (BWP)/CC/band or may be transmitted and received by using different BWPs/CCs/bands. In each of the following drawings of the present disclosure, a structure in one CC will be described. However, the number of frequency-direction resources is not limited to this.

In the present disclosure, a PUCCH transmitted in a DL reception period (for example, a DCI/PDSCH reception period) may be different from a PUCCH defined in Rel. 15 or 16 or previous versions in terms of at least one of waveform, sequence index, cyclic shift index (cyclic shift number), coding method, orthogonal cover code (OCC) index, and the number of bits. The PUCCH transmitted in the DL reception period (for example, the PDSCH reception period) may be a sequence-based PUCCH (for example, a PUCCH using PUCCH format 0).

In the present disclosure, a PUCCH resource may be configured/indicated to a UE by using at least one of higher layer signaling and DCI. For indication of a PUCCH resource by DCI, a specific field included in the DCI (PUCCH resource indicator (PRI) field/control channel element (CCE) index field) may be used.

In each of the following embodiments, an uplink operation band may be equal to a downlink operation band, and a DL signal/channel and a UL signal/channel may be mapped (allocated) in one operation band defined as a combination of the uplink operation band and the downlink operation band. The operation band may be different from a TDD operation band or may be different from at least one of the TDD operation band, an FDD operation band, and a supplementary uplink (SUL) operation band. In each of the following embodiments, a DL signal/channel and a UL signal/channel may be mapped to different frequency resources in the one operation band. In each of the following embodiments, a DL signal/channel and a UL signal/channel in the different frequency resources in the one operation band may overlap in the time domain. In the present disclosure, "A and B overlap" and "at least part of A overlap at least part of B" may be interchangeably interpreted.

In each of the following embodiments of the present disclosure, the UE may report (transmit), to the NW, whether to have capability (which may be referred to as UE capability information below) of simultaneously performing reception of a DL signal/channel and transmission of a UL signal/channel in a period (UL transmission period) used for transmission of a UL signal/channel configured in time resources the same as at least part of the period (DL reception period) used for reception of a DL signal/channel. The UE capability information may indicate whether the UE supports to simultaneously perform reception of a DL signal/channel and transmission of a UL signal/channel in one operation band.

The UE capability information may be defined as whether to support to simultaneously perform reception of a DL signal/channel and transmission of a UL signal/channel. In other words, the capability information may be defined as whether full duplex communication is applicable. In each of the following embodiments, "reception of a DL signal/channel and transmission of a UL signal/channel are simultaneously performed in one operation band" and full duplex communication may be interchangeably interpreted.

The UE capability information may be defined as the number of channels/number of RSs transmittable/receivable simultaneously. The UE capability information may be defined as the number of channels/number of RSs transmittable/receivable simultaneously in one operation band.

Note that each of the following embodiments of the present disclosure may be applied under the condition of at least one of when the UE reports UE capability corresponding to at least one of the above to the NW and when the at least one UE capability above is configured for/activated for/indicated to the UE by higher layer signaling. Each of the following embodiments of the present disclosure may be applied when a specific higher layer parameter is configured for/activated for/indicated to the UE.

Note that, in the present disclosure, drop, stop, cancel, puncture, rate match, and the like may be interchangeably interpreted.

First Embodiment

Embodiment 1-1

In Embodiment 1-1, the UE may be configured/controlled/indicated with UL/DL resources according to the following steps (which may be referred to as stages, procedures, processes, and operations). In the present disclosure, the UL/DL resources may be referred to as a slot structure. Note that the slot structure (configuration) in the present disclosure may be interpreted with a term obtained by interpreting a slot with another term as described above.

Step 1: A slot structure in a system is configured for/indicated to the UE.

Step 2: The UE is configured/indicated with UL/DL time/frequency resources in which the UE can actually perform transmission/reception, based on at least one of higher layer signaling and physical layer signaling.

Note that, in the present disclosure, the "UE is configured/indicated with UL/DL time/frequency resources in which the UE can actually perform transmission/reception" may be interpreted as the "UE is scheduled with UL resources/DL resources."

In the above slot structure, a UL symbol/slot (which may be referred to as a UL resource) and a DL symbol/slot (which may be referred to as a DL resource) may be configured/defined in an overlapped manner in the same time domain (for example, symbol) for the UE.

In the above slot structure, a UL symbol/slot and a DL symbol/slot may be configured/defined in the same CC/cell/BWP for the UE. In the above slot structure, a UL symbol/slot and a DL symbol/slot may be configured/defined in different CCs/cells/BWPs for the UE. The different CCs/cells/BWPs may be different CCs/cells/BWPs in the same operation band or may be different CCs/cells/BWPs in different operation bands.

In the above slot structure, a resource of at least one of UL symbols/slots and DL symbols/slots may be configured by higher layer signaling (broadcast information, for example, higher layer control information/system information) for the UE.

Figures 3A, 3B:
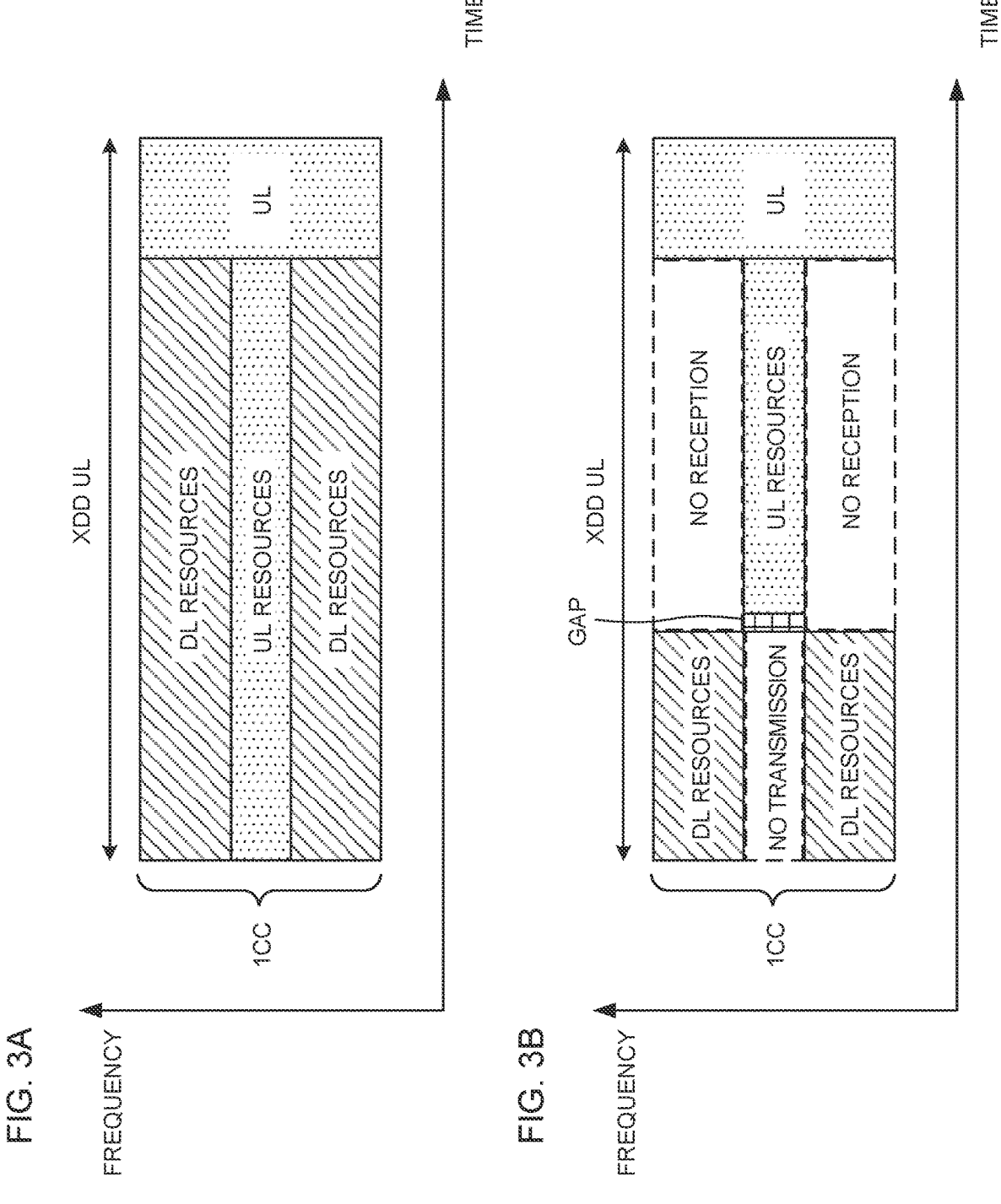
FIGS. 3A and 3B are diagrams to show examples of a slot structure and UL/DL resources in which transmission/reception is possible in a system.

FIG. 3A is a diagram to show an example of a slot structure in a system. The slot structure shown in FIG. 3A includes DL resources and UL resources in a certain time period. In the example shown in FIG. 3A, the DL resources and the UL resources may be configured to overlap in the same time domain (for example, symbol). In the example shown in FIG. 3A, the DL resources and the UL resources may be configured in the same CC (one CC). With such a structure, a plurality of CCs need not be used to allocate the DL resources and the UL resources.

As the slot structure shown in FIG. 3A, a division duplex method combining TDD and frequency division duplex (FDD) for UL and DL may be defined. The division duplex method may be referred to as XDD (X is any character), may be referred to as TDD/FDD, or may be referred to as TDD+FDD.

Note that allocation of DL and UL resources shown in the slot structure shown in FIG. 3A is merely an example, and this is not restrictive. For example, both edges of the allocated CC/BWP (frequency resources at the upper edge and lower edge of the CC/BWP) may be allocated to UL resources. In this way, frequency hopping of a UL channel/signal (for example, a PUCCH) of the UE can be favorably used, which can improve UL frequency diversity. A gap period in which transmission and reception are not performed may be configured in a certain time period immediately before the UL resources.

In Step 2, when the UE is configured with resources in which transmission (reception) of a UL (DL) signal/channel is possible, the UE may judge/determine/derive resources in which reception (transmission) of a DL (UL) signal/channel is possible.

For example, when the UE is configured with resources in which transmission of a UL signal/channel is possible, the UE may assume that reception of a DL signal/channel is not performed in the resources (time domain, symbol, slot) in which transmission of a UL signal/channel is possible. Configuration/indication of the resources in which transmission of a UL signal/channel is possible for/to the UE may be performed based on configuration information/indication information for which at least one of higher layer signaling and physical layer signaling is used.

In this case, the UE may judge/determine/derive DL resources in the slot structure excluding the same symbols/slots configured with the resources in which transmission of a UL signal/channel is possible, as resources in which reception of a DL signal/channel is possible.

For example, when the UE is configured with resources in which reception of a DL signal/channel is possible, the UE may assume that transmission of a UL signal/channel is not performed in the resources (time domain, symbol, slot) in which reception of a DL signal/channel is possible. Configuration/indication of the resources in which reception of a DL signal/channel is possible for/to the UE may be performed based on configuration information/indication information for which at least one of higher layer signaling and physical layer signaling is used.

In this case, the UE may judge/determine/derive UL resources in the slot structure excluding the same symbols/slots configured with the resources in which reception of a DL signal/channel is possible, as resources in which transmission of a UL signal/channel is possible.

In Step 2, resources in which reception of a DL signal/channel is possible and resources in which transmission of a UL signal/channel is possible may be configured. The configuration for the UE may be performed based on configuration information/indication information for which at least one of higher layer signaling and physical layer signaling is used.

FIG. 3B is a diagram to show an example of UL/DL resources in which transmission/reception is possible, configured for the UE. The example shown in FIG. 3B shows UL/DL resources in which the UE can actually perform transmission/reception among UL/DL resources included in a slot structure as that configured in FIG. 3A. For example, the UE is configured with resources in which transmission of a UL channel/signal is possible, by using higher layer signaling. Then, the UE does not assume to perform reception of a DL signal/channel in the same time domain as that of the resources in which transmission of a UL signal/channel is possible. In addition, the UE judges/determines resources in which reception of a DL channel/signal is possible in a different time domain from that of the resources in which transmission of a UL signal/channel is possible. A gap period (TA gap) in which transmission and reception are not performed may be configured in a certain time period immediately before the resources in which transmission of a UL channel/signal is possible. The UE may be notified of information that configures/indicates the gap period, based on higher layer signaling/physical layer signaling, or the information may be reported by UE capability information or may be defined in advance in a specification.

Note that allocation of DL and UL resources shown in the slot structure shown in FIG. 3B is merely an example, and this is not restrictive.

Embodiment 1-2

In Embodiment 1-2, the UE may be configured/controlled/indicated with UL/DL resources according to the following steps.

Step 1: The UE is configured/indicated with UL/DL time/frequency resources in which the UE can actually perform transmission/reception, based on at least one of higher layer signaling and physical layer signaling.

In Step 1, resources in which reception of a DL signal/channel is possible and resources in which transmission of a UL signal/channel is possible may be configured separately. The configuration for the UE may be performed based on configuration information/indication information for which at least one of higher layer signaling and physical layer signaling is used.

For example, when the UE is configured with resources in which transmission of a UL signal/channel is possible, the UE may assume that reception of a DL signal/channel is not performed in the resources (time domain, symbol, slot) in which transmission of a UL signal/channel is possible.

For example, when the UE is configured with resources in which reception of a DL signal/channel is possible, the UE may assume that transmission of a UL signal/channel is not performed in the resources (time domain, symbol, slot) in which reception of a DL signal/channel is possible.

As in the example shown in FIG. 3B, resources in which reception of a DL signal/channel is possible and resources in which transmission of a UL signal/channel is possible may be configured for the UE separately.

Note that, in an existing system, four BWPs at maximum are configurable per CC. However, a BWP may be configured (switched) for each UL/DL resource, or one or a plurality of BWPs included in one CC may be selected/activated for UL/DL resources, in the slot structures described in Embodiment 1-1 and Embodiment 1-2/UL/DL time/frequency resources in which actual transmission/reception is possible.

Embodiment 1-3

Figure 4:
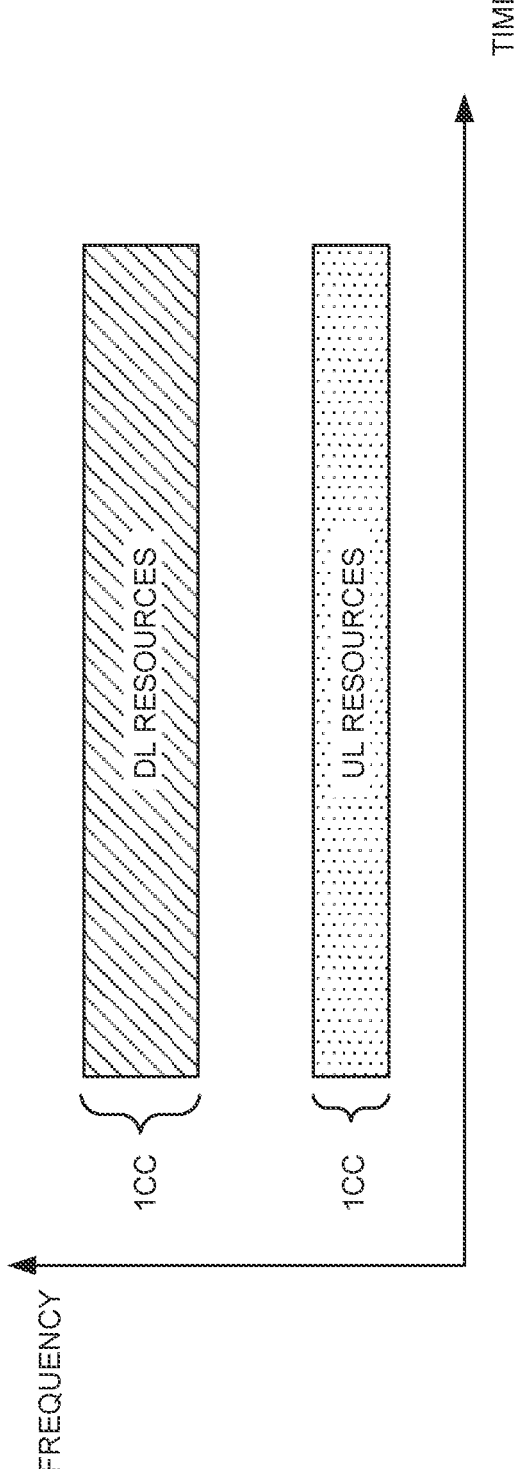
FIG. 4 is a diagram to show an example of DL resources and UL resources configured for a UE.

DL resources and UL resources configured for the UE may be configured in different CCs (see FIG. 4). In this method, an existing TDD/FDD operation method (defined in Rel. 16 or previous versions) can be used.

In the present disclosure, UL and DL resources need not be configured in the same CC/BWP. Each of the embodiments of the present disclosure is also applicable to a case where UL and DL resources are configured for each different CC. In this case, UL and DL resources may be configured in the same time domain of different CCs/BWPs to overlap in terms of time.

Resources that are configured for/indicated to the UE and in which at least one of transmission of a UL signal/channel and reception of a DL signal/channel is possible may be configured for/indicated to each UE separately. In this case, for example, resources in which reception of a DL signal/channel by a certain UE is not performed may be resources in which reception of a DL signal/channel by another UE is performed. For example, resources in which transmission of a UL signal/channel by a certain UE is not performed may be resources in which transmission of a UL signal/channel by another UE is performed.

Resource that are configured for/indicated to the UE and in which at least one of transmission of a UL signal/channel and reception of a DL signal/channel is possible may be configured for/indicated to a plurality of UEs in common. For example, the UE may assume that resources in which reception of a DL signal/channel is possible are configured for/indicated to the plurality of UEs in common in reception of a DL signal/channel using multicast/broadcast.

When the UE reports (transmits), to the NW, that the UE has capability of simultaneously performing reception of a DL signal/channel and transmission of a UL signal/channel, the UE may assume that configuration of resources in which at least one of transmission of a UL signal/channel and reception of a DL signal/channel is possible as that described in Step 2 of Embodiment 1-1 described above and Step 1 in Embodiment 1-2 described above is not performed. In this case, the UE may judge/determine/recognize that transmission of a UL signal/channel and reception of a DL signal/channel are possible in all the configured UL and DL resources as described in Step 1 in Embodiment 1-1 described above.

In contrast, even when the UE reports, to the NW, that the UE has capability of simultaneously performing reception of a DL signal/channel and transmission of a UL signal/channel, the UE may perform at least one of reception of a DL signal/channel and transmission of a UL signal/channel in the configured resources in which transmission/reception is possible, without performing simultaneous transmission and reception when resources in which at least one of transmission of a UL signal/channel and reception of a DL signal/channel is possible is configured. In this way, available resources can be separately configured for each UE, which allows distribution of resources to be used. Moreover, by limiting available resources for each UE, signaling overhead (for example, the number of bits of DCI) necessary for resource allocation is reduced to allow efficient operation.

According to the first embodiment above, it is possible to appropriately configure a structure of a time period in which UL resources can be ensured and configure/indicate DL and UL resources to be actually used.

Second Embodiment

In the following, a method of configuring/indicating a slot structure (XDD) in the first embodiment above will be described.

The UE may be notified of the configuration of the slot structure by using higher layer signaling.

A parameter indicating that part or all of DL symbols are usable as DL and UL symbols may be included in an information element of a parameter related to a TDD UL and DL configuration (for example, TDD-UL-DL-ConfigCommon/TDD-UL-DL-ConfigDedicated) defined in Rel. 16 or previous versions (Embodiment 2-1). The DL and UL symbols may mean symbols in which reception of a DL signal/channel and transmission of a UL signal/channel can be performed.

In addition to Embodiment 2-1, UL frequency resource positions of the DL and UL symbols may be configured/notified by the parameter included in the information element of the parameter related to a TDD UL and DL configuration (for example, TDD-UL-DL-ConfigCommon/TDD-UL-DL-ConfigDedicated) or a parameter included in another information element (Embodiment 2-2).

Configuration of XDD may be notified by an information element different from the parameter related to a TDD UL and DL configuration (for example, TDD-UL-DL-Config- Common/TDD-UL-DL-ConfigDedicated) defined in Rel. 16 or previous versions (Embodiment 2-3). The configuration of XDD may mean configuring/notifying the above-described slot structure. The configuration of XDD may mean configuring which time resources (for example, symbols)/ which frequency resources can be used for reception of a DL signal/channel and transmission of a UL signal/channel.

For the indication of a slot structure, downlink control information (DCI) may be used. The DCI format of the DCI may be DCI format (for example, DCI format 0_0/0_1/1_0/ 1_1) for performing scheduling/triggering. The DCI format of the DCI may be group-common DCI format different from the DCI format for performing scheduling/triggering. The group-common DCI format may be DCI format (for Example, DCI format 2_0) including a field indicating a slot format.

A format for indicating DL and UL symbols may be added to a field for indicating a slot format of which the UE is notified (Embodiment 2-4). In Embodiment 2-4, for example, when transmission/reception of a specific signal/ channel (for example, a configured grant PUSCH/SPS PDSCH/periodic (P) CSI-RS/semi-persistent (SP) CSI-RS) is configured for the corresponding one(s) of the symbols indicated as the DL and UL symbols in the field, the UE may preferentially perform the transmission/reception of the specific channel.

The UE may be notified that the DL (or UL) symbol(s) is of the DL and UL symbols, based on a field indicating a slot format defined in Rel. 16 or previous versions and configuration information (for example, an RRC information element)/indication information (indication field) different from the field (Embodiment 2-5).

Note that, in Embodiment 2-1 to 2-5 above, a resource in the time domain and a resource in the frequency domain may be configured for/indicated to the UE by using higher layer signaling/DCI.

In the following, a time period in which reception of a DL signal/channel and transmission of a UL signal/channel are possible and a time period in which only transmission of a UL signal/channel is possible will be described (Embodiment 2-6). present disclosure, the time period in which reception of a DL signal/channel and transmission of a UL signal/channel are possible may be referred to as a first time period. The time period in which only transmission of a UL signal/channel is possible may be referred to as a second time period.

The UE need not assume (expect) scheduling for/resource allocation to a channel/RS over the first time period and the second time period (Embodiment 2-6-1).

In Embodiment 2-6-1, the base station only need perform such control as not to perform scheduling of/resource allocation to a channel/RS over the first time period and the second time period. Note that, when repetition transmission (repetition) is applied/configured, the UE/base station may perform such control as not to perform repetition transmission over the first time period and the second time period.

The UE may assume scheduling of/resource allocation to a channel/RS over the first time period and the second time period (Embodiment 2-6-2).

In Embodiment 2-6-2, the base station may support scheduling of/resource allocation to a channel/RS over the first time period and the second time period. Note that, when repetition transmission (repetition) is applied/configured, the UE/base station may perform such control as to support repetition transmission over the first time period and the second time period.

In Embodiment 2-6-2, when scheduling of/resource allocation to a channel/RS over the first time period and the second time period is performed for the UE, resources (for example, frequency resources) other than those in the time domain may be equal for the first time period and the second time period in the scheduling/resource allocation (Embodiment 2-6-2-1).

Figures 5A, 5B:
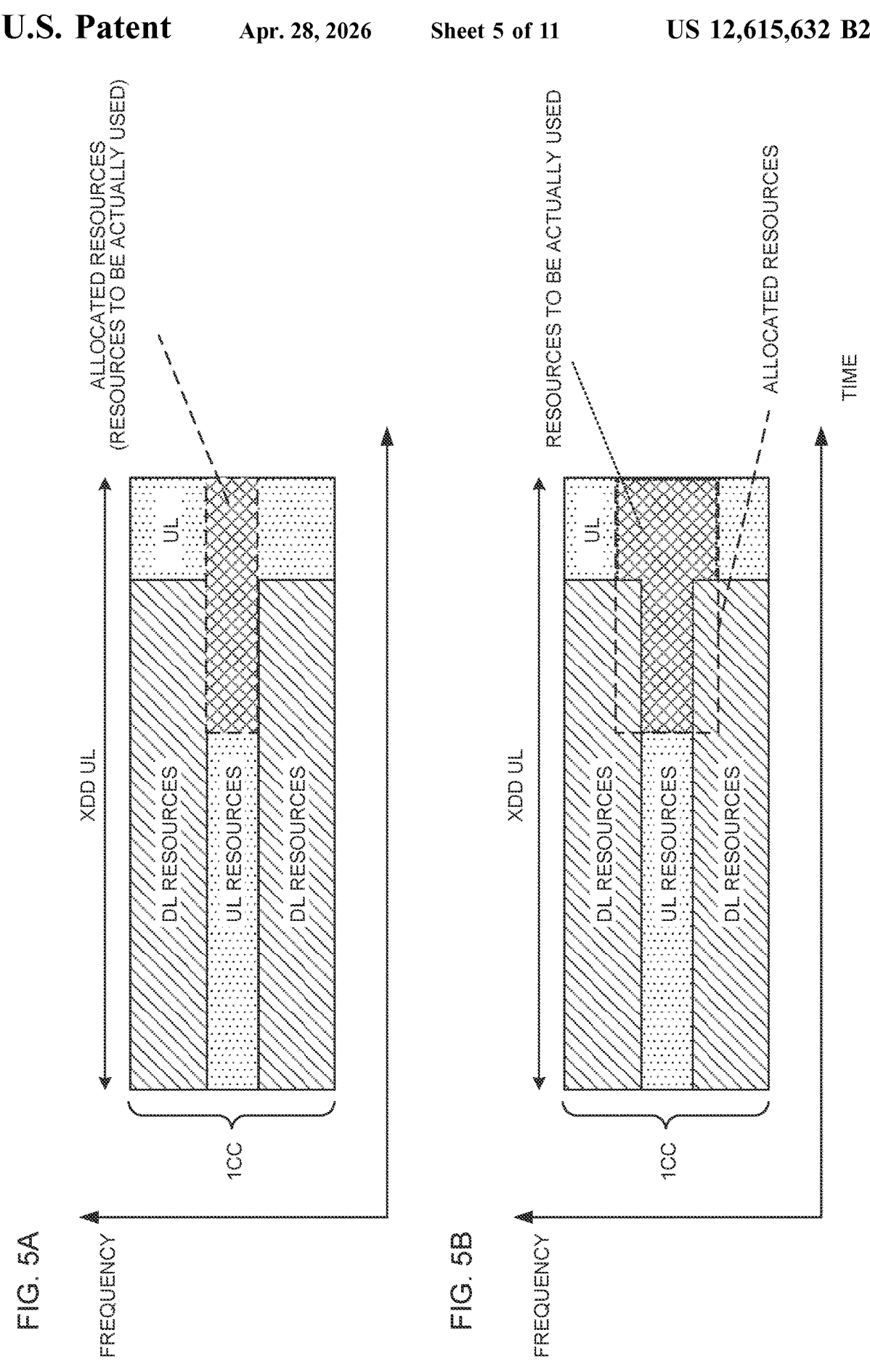
FIGS. 5A and 5B are diagram to show examples of a scheduling method according to Embodiment 2-6-2.

FIG. 5A is a diagram to show an example of a scheduling method according to Embodiment 2-6-2-1. In the example shown in FIG. 5A, a slot structure as that described in Embodiment 1-1 is configured for the UE. A UL channel/RS over the first time period and the second time period is scheduled for the UE in the slot structure. In this case, the UE may determine that the resources scheduled for the UL channel/RS are resources to be actually used.

Alternatively, in Embodiment 2-6-2, when scheduling of/resource allocation to a channel/RS over the first time period and the second time period is performed for the UE, resources (for example, frequency resources) other than those in the time domain may be different between the first time period and the second time period in the scheduling/ resource allocation (Embodiment 2-6-2-2).

FIG. 5B is a diagram to show an example of a scheduling method according to Embodiment 2-6-2-2. In the example shown in FIG. 5B, a slot structure as that described in Embodiment 1-1 is configured for the UE. A UL channel/RS over the first time period and the second time period is scheduled for the UE in the slot structure. In this case, the UE may determine that the resources other than the resources that cannot be actually used (for example, DL resources) among the resources in which the UL channel/RS is scheduled, as resources to be actually used. For example, when a channel to be scheduled is a data channel, rate matching of a data signal may be performed according to the resource to be actually used.

Note that a method applied to a case where the slot structure described in Step 1 in Embodiment 1-1 above is configured has been described in Embodiment 2-6-2 above, but the method is also applicable to a case where the configuration of available resources described in Step 2 in Embodiment 1-1 above or Step 1 in Embodiment 1-2 above is performed.

According to the second embodiment above, it is possible to appropriately configure a structure of a time period in which UL resources can be ensured and configure/indicate DL and UL resources to be actually used.

Third Embodiment

In a third embodiment, a method of determining resource numbers for (numbering) resources for time domain resource allocation (TDRA)/frequency domain resource allocation (FDRA) in the slot structures/resource configurations described in the first embodiment above will be described. In this embodiment, an upper edge and a lower edge may be interchangeably interpreted.

Embodiment 3-1

Figures 6A, 6B:
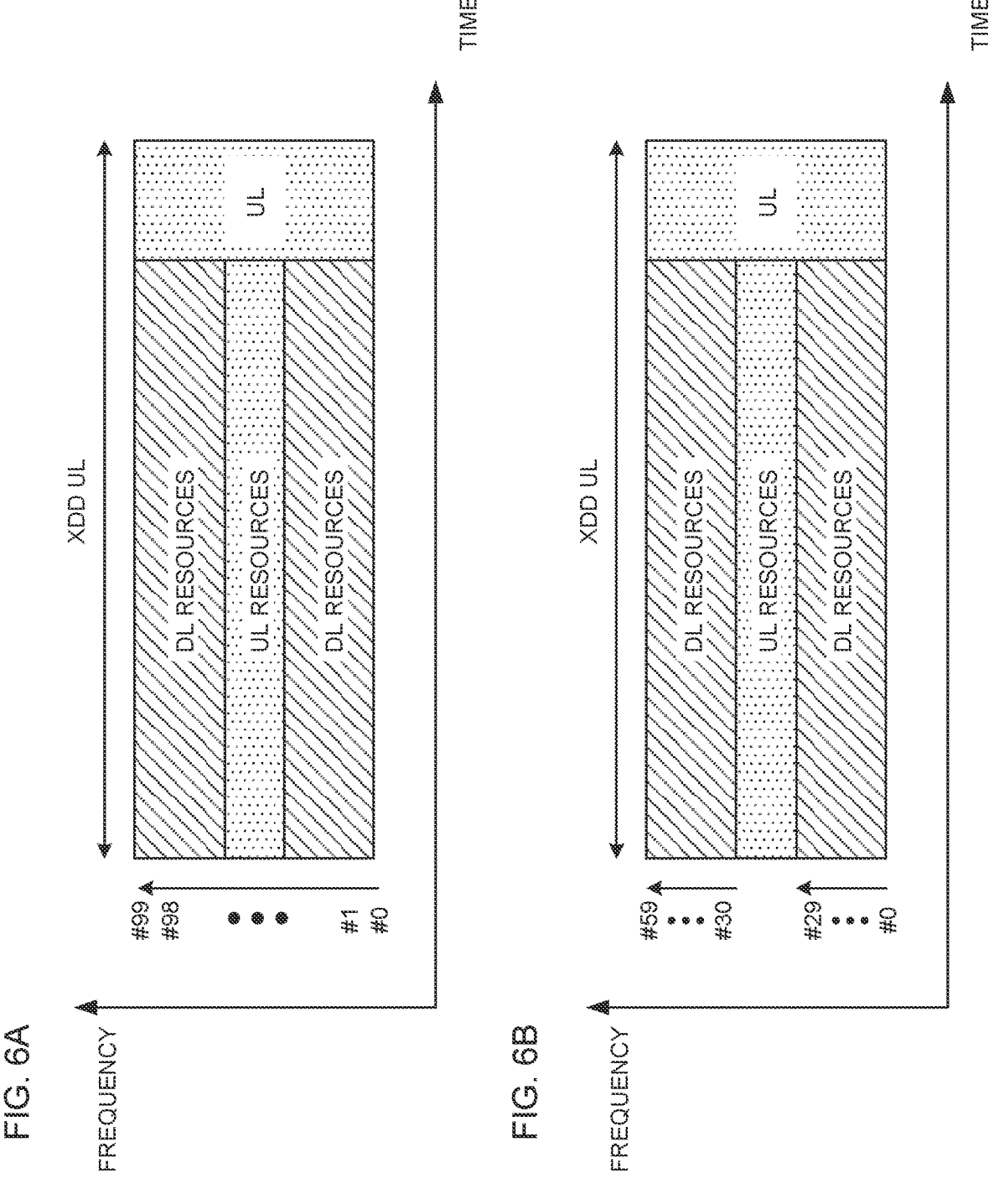
FIGS. 6A and 6B are diagrams to show examples of a method of configuring resource numbers.

In a slot structure configured for the UE, symbol/slot/ subframe/frame indices and resource element (RE)/physical resource block (PRB)/PRB group (PRG) indices may be determined/numbered without distinguishing between UL and DL resources, in ascending order from the lower edge (lowest frequency/earliest time resource) toward the upper edge (highest frequency/latest time resource) of the DL/UL resources configured in the slot structure (see FIG. 6A).

According to Embodiment 3-1, for example, resource numbers can be set commonly for a plurality of UEs, and hence, Embodiment 3-1 is preferable when reception of a channel using multicast is performed.

Embodiment 3-2

In a slot structure configured for the UE, symbol/slot/subframe/frame indices and RE/PRB/PRG indices may be determined/numbered separately for UL resources and DL resources, in ascending order from the lower edge toward the upper edge of the DL/UL resources configured in the slot structure (see FIG. 6B).

In the example shown in FIG. 6B, for example, determination of numbers for DL resources is performed separately from that for UL resources. Here, a case where sequential resource numbers are given to a plurality of DL resources arranged to sandwich UL resources is shown. However, this is not restrictive. For example, resource numbers may be given for each UL/DL BWP.

According to Embodiment 3-2, for example, information amount necessary for notifying the UE of resource numbers (indices) can be reduced when scheduling based on DCI is performed, and hence, Embodiment 3-2 is preferable when transmission/reception of a channel using unicast is performed.

Embodiment 3-3

Figures 7A, 7B:
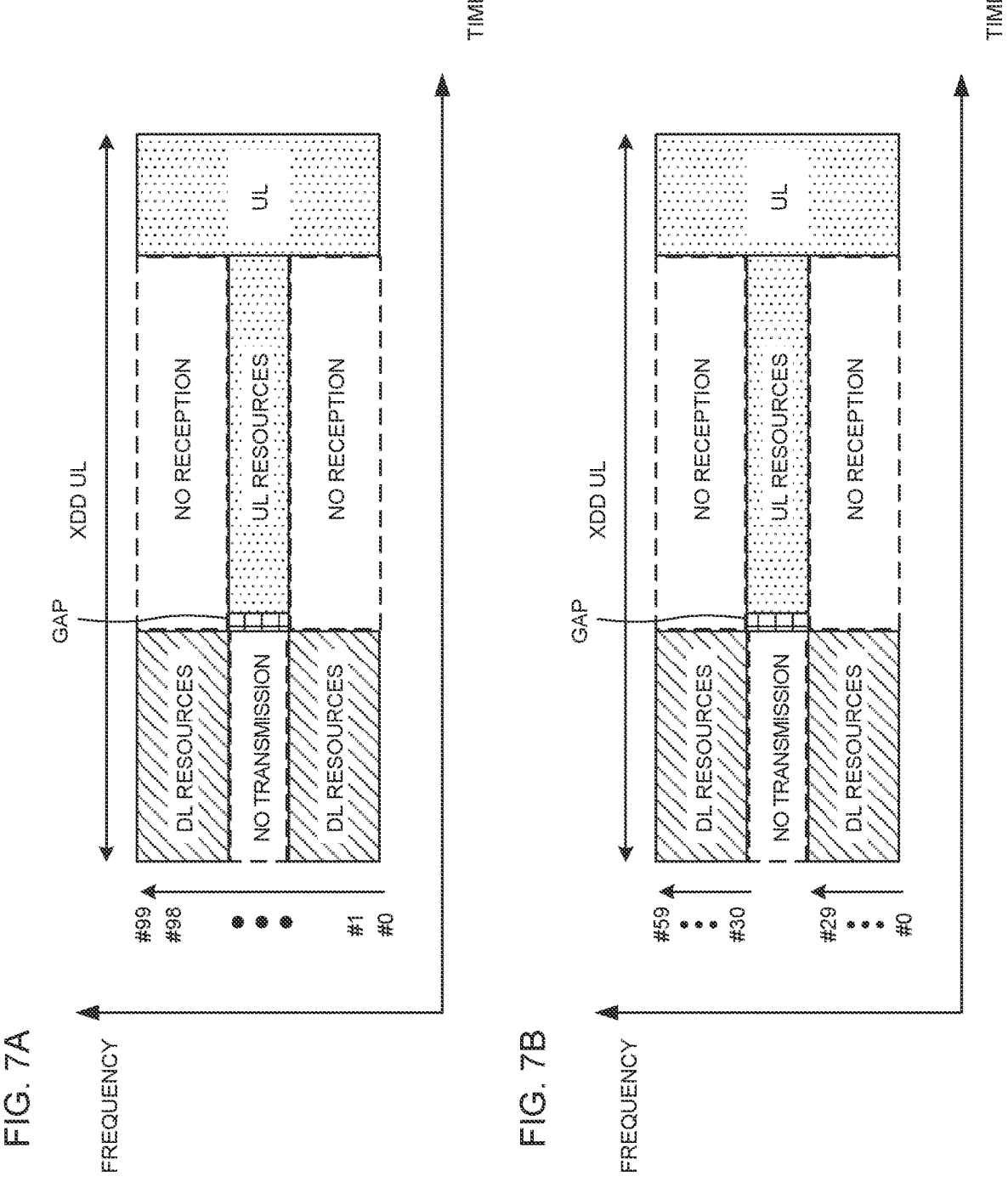
FIGS. 7A and 7B are diagrams to show other examples of the method of configuring resource numbers.

In available DL/UL resources configured for/indicated to the UE, symbol/slot/subframe/frame indices and RE/PRB/PRG indices may be determined without distinguishing between UL and DL resources, in ascending order from the lower edge toward the upper edge (highest frequency/most recent time resource) of the available DL/UL resources (see FIG. 7A).

In Embodiment 3-3, resource numbers may also be allocated to resources that the UE cannot actually use.

According to Embodiment 3-3, as Embodiment 3-1, for example, resource numbers can be set commonly for a plurality of UEs, and hence, Embodiment 3-3 is preferable when reception of a channel using multicast is performed.

Embodiment 3-4

In available DL/UL resources configured for/indicated to the UE, symbol/slot/subframe/frame indices and RE/PRB/PRG indices may be determined separately for UL resources and DL resources, in ascending order from the lower edge toward the upper edge of the available DL/UL resources (see FIG. 7B).

In the example shown in FIG. 7B, for example, determination of numbers for DL resources is performed separately from that for UL resources. In Embodiment 3-4, resource numbers may also be allocated to resources that the UE cannot actually use.

According to Embodiment 3-4, as Embodiment 3-2, for example, information amount necessary for notifying the UE of resource numbers (indices) can be reduced when scheduling based on DCI is performed, and hence, Embodiment 3-4 is preferable when transmission/reception of a channel using unicast is performed.

Further, according to Embodiment 3-4, determination of resource numbers is not performed for resources that cannot be used in advance, and hence limited bits of DCI can be used efficiently. Compared with Embodiment 3-4, Embodiment 3-2 is preferable since resource numbers are determined commonly among a plurality of UEs (or in units of cells).

Embodiment 3-5

Embodiments 3-1 to 3-4 may be applied by being switched for each channel/signal. For example, the UE may apply at least one of Embodiments 3-1 to 3-4, based on whether unicast or multicast is used for reception of a channel/signal.

For example, the UE may apply at least one of Embodiments 3-1 to 3-4 above, to at least one of a PDCCH/DCI related to a CORESET/search space of unicast and a PDSCH/PUSCH scheduled by DCI format x_1/x_2 (x is any integer).

For example, the UE may apply at least one of Embodiments 3-1 to 3-4 above, to at least one of a PDCCH/DCI related to a common CORESET/search space and a PDSCH/PUSCH scheduled by DCI format x_0/2_x (x is any integer).

According to the third embodiment above, it is possible to appropriately determine resource numbers even when a structure of a time period in which UL resources can be ensured is configured.

Fourth Embodiment

In a fourth embodiment, UE capability will be described. The UE may report (transmit), to the NW, whether the UE has the capability (UE capability information related to the capability).

The capability may be defined as whether to support to simultaneously perform reception of a DL signal/channel and transmission of a UL signal/channel. In other words, the capability may be defined as whether full duplex communication is applicable.

The capability may be defined as the number of channels/signals (reference signals) that can be transmitted/received simultaneously.

The capability may be defined by whether a slot structure as that configured in Step 1 in Embodiment 1-1 is applicable.

The capability may be defined by whether a slot structure as that configured in Step 2 in Embodiment 1-1/Step 1 in Embodiment 1-2 (configuration/indication of available resources) is applicable.

The capability may be defined by whether to support a UL symbol/slot and a DL symbol/slot in a band (intra-band, intra-CC)/between bands (inter-band, inter-CC). For example, the UE may report any of capability of supporting configuration of a UL symbol/slot and a DL symbol/slot in one CC (intra-CC), capability of supporting configuration of a UL symbol/slot and a DL symbol/slot for each different CC (inter-CC), and capability of supporting both configuration of a UL symbol/slot and a DL symbol/slot in one CC (intra-CC) and configuration of a UL symbol/slot and a DL symbol/slot for each different CC (inter-CC). For example, the UE may report any of capability of supporting configuration of a UL symbol/slot and a DL symbol/slot for each different CC (inter-CC) and capability of supporting both configuration of a UL symbol/slot and a DL symbol/slot in one CC (intra-CC) and configuration of a UL symbol/slot and a DL symbol/slot for each different CC (inter-CC).

Note that each of the following embodiments of the present disclosure may be applied under the condition of at least one of when the UE reports UE capability corresponding to at least one of the above to the NW and when the at least one UE capability above is configured for/activated for/indicated to the UE by higher layer signaling. Each of the following embodiments of the present disclosure may be applied when a specific higher layer parameter is configured for/activated for/indicated to the UE.

According to the fourth embodiment above, the UE can perform the method described in any of the above-described embodiments while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
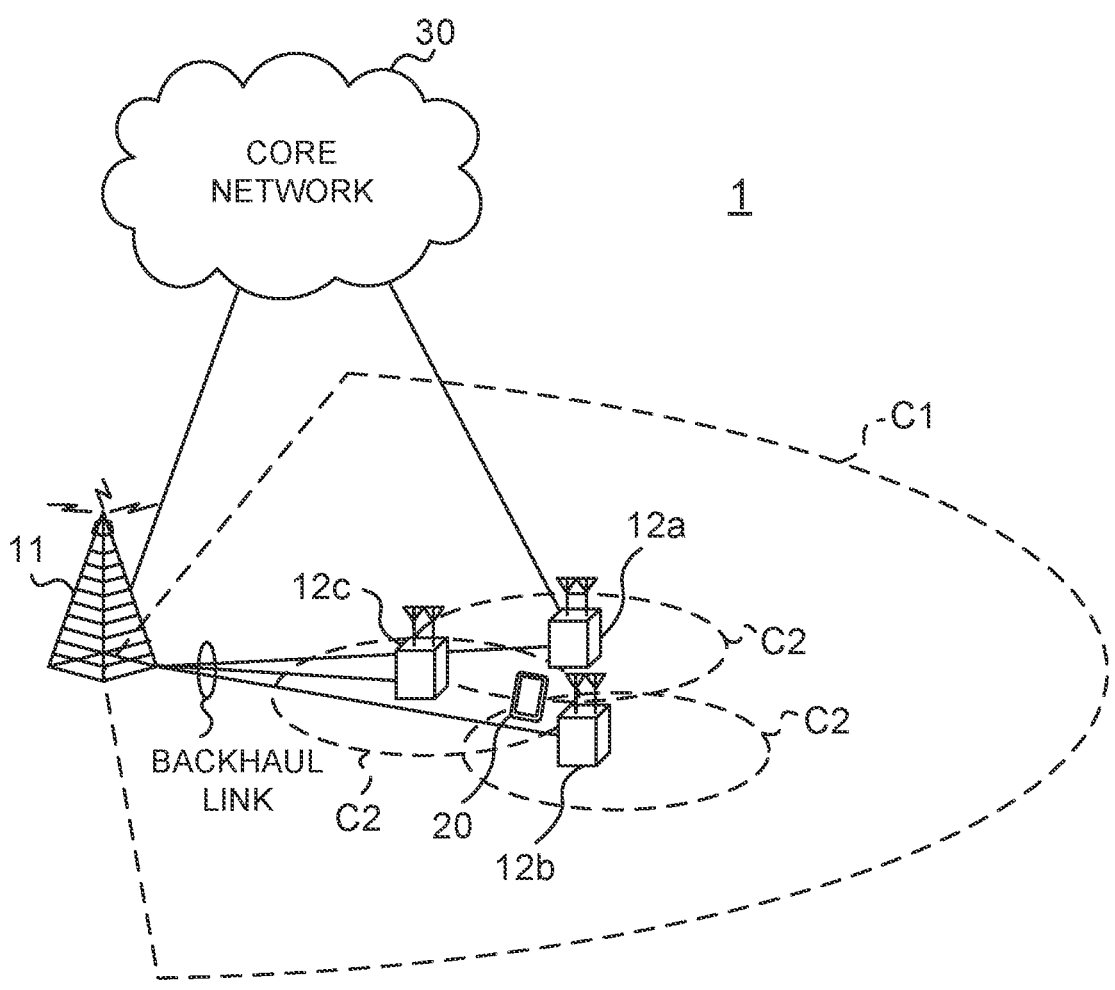
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
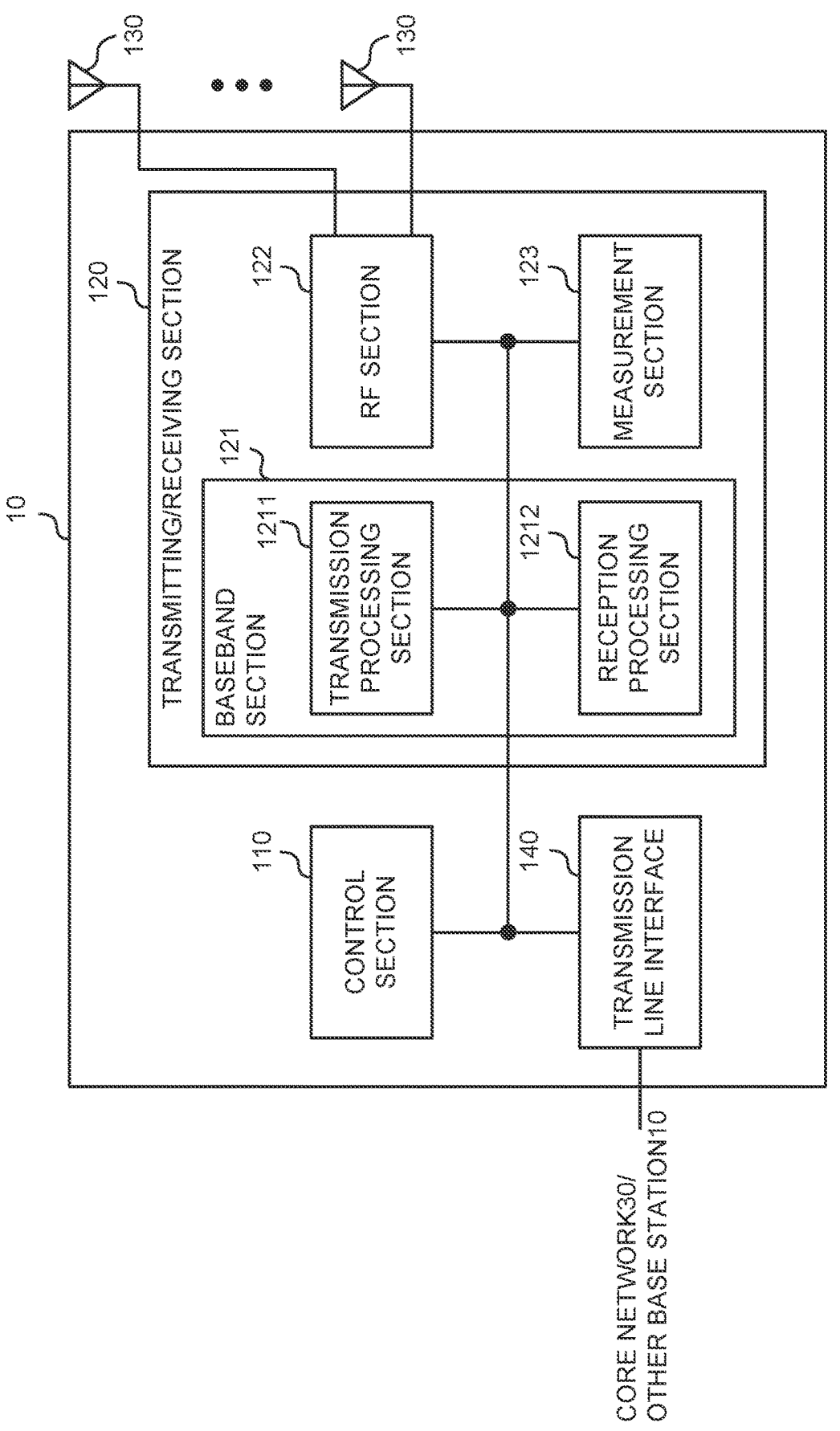
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to at least one of a schedule of an uplink (UL) channel and a schedule of a downlink (DL) channel. The control section 110 may control indication of at least one of transmission of a UL channel in a UL resource and reception of a DL channel in a DL resource, based on a structure (for example, a slot structure) of a period in which the UL resource and the DL resource can be configured in the same time domain and the information (first and second embodiments).

(User Terminal)

Figure 10:
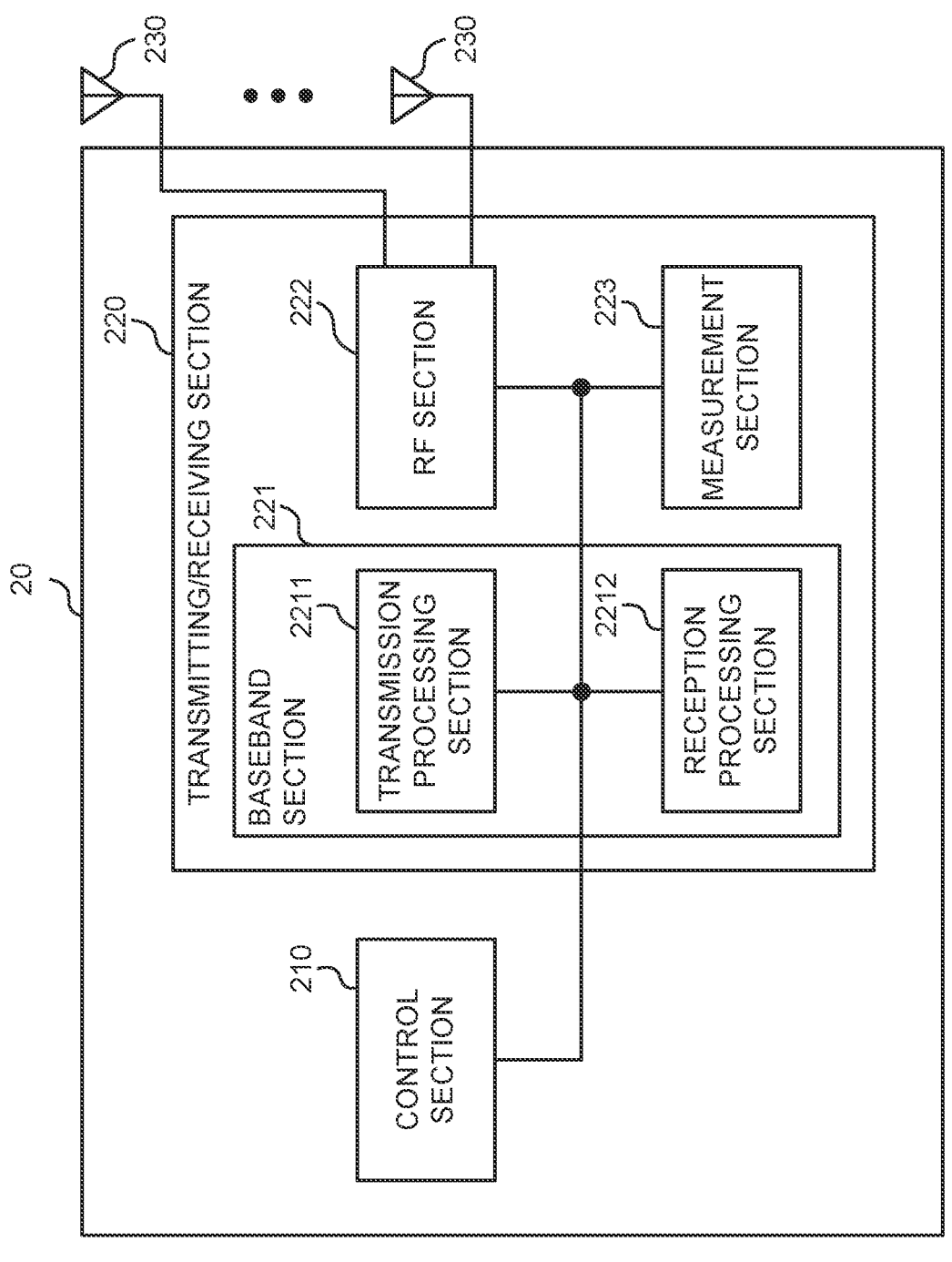
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to at least one of a schedule of an uplink (UL) channel and a schedule of a downlink (DL) channel. The control section 210 may control at least one of transmission of a UL channel/signal in a UL resource and reception of a DL channel/signal in a DL resource, based on a structure (for example, a slot structure) of a period in which the UL resource and the DL resource can be configured in the same time domain and the information (first and second embodiments).

The control section 210 may further determine the schedule of the DL channel, based on the schedule of the UL channel or determine the schedule of the UL channel, based on the schedule of the DL channel (first embodiment).

The UL resource and the DL resource may be configured in the same serving cell (CC) or configured in different serving cells (CCs) (first embodiment).

For the information, at least one of higher layer signaling related to a UL and DL configuration for time division duplex (TDD) and downlink control information may be used (first and second embodiments).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
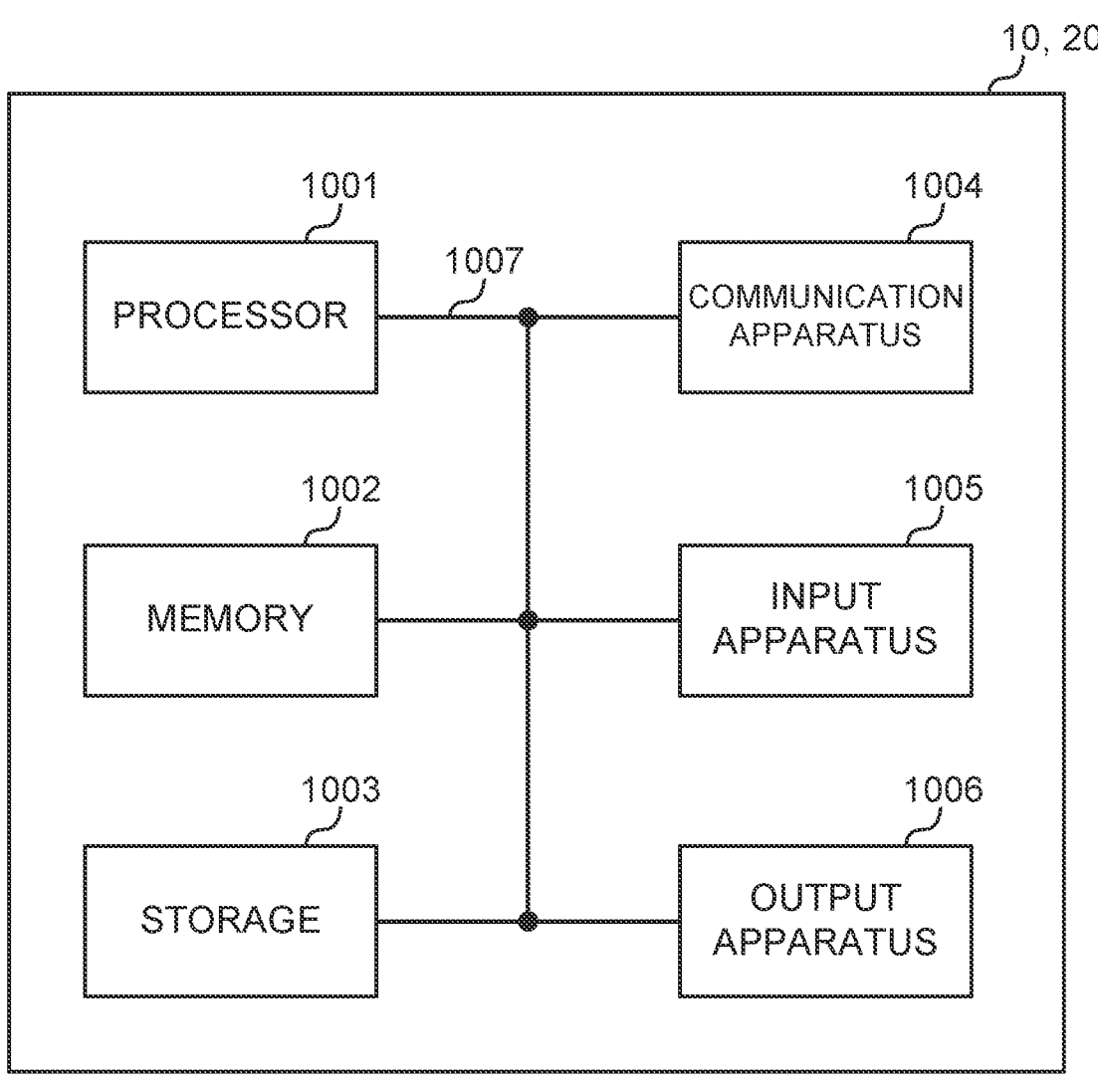
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," a "serving cell," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives:
    a first configuration of a first time resource of a downlink (DL) resource and an uplink (UL) resource, the DL resource and the UL resource being configured to overlap in a same symbol in one serving cell,
    a second configuration of a frequency of the DL resource, and
    a third configuration of a frequency of the UL resource; and
a processor that controls, based on the first configuration, the second configuration, and the third configuration, at least one of reception of a DL signal in the DL resource and transmission of a UL signal in the UL resource,
wherein the processor controls to receive the DL signal in the first time resource and controls to transmit a UL channel over a second time resource in the one serving cell,
wherein, during the second time resource, a DL resource is separate, in time domain and frequency domain, from any UL resource in any symbol in the one serving cell, and
wherein the second configuration and the third configuration are included in a configuration that is different from a UL and DL configuration in time division duplexing (TDD).

2. The terminal according to claim 1, wherein the first configuration is included in a UL and DL configuration in time division duplexing (TDD).

3. A radio communication method for a terminal, comprising:
receiving:
    a first configuration of a first time resource of a downlink (DL) resource and an uplink (UL) resource, the DL resource and the UL resource being configured to overlap in a same symbol in one serving cell,
    a second configuration of a frequency of the DL resource, and
    a third configuration of a frequency of the UL resource; and
controlling, based on the first configuration, the second configuration, and the third configuration, at least one of reception of a DL signal in the DL resource and transmission of a UL signal in the UL resource,
wherein the terminal controls to receive the DL signal in the first time resource and controls to transmit a UL channel over a second time resource in the one serving cell, wherein, during the second time resource, a DL resource is separate, in time domain and frequency domain, from any UL resource in any symbol in the one serving cell, and wherein the second configuration and the third configuration are included in a configuration that is different from a UL and DL configuration in time division duplexing (TDD).

4. A base station comprising:

a transmitter that transmits:

a first configuration of a first time resource of a downlink (DL) resource and an uplink (UL) resource, the DL resource and the UL resource being configured to overlap in a same symbol in one serving cell, a second configuration of a frequency of the DL resource, and a third configuration of a frequency of the UL resource; and a processor that controls indication, to a terminal, of at least one of reception of a DL signal in the DL resource and transmission of a UL signal in the UL resource, based on the first configuration, the second configuration, and the third configuration, wherein the processor controls to transmit the DL signal in the first time resource and controls to receive a UL channel over a second time resource in the one serving cell, wherein, during the second time resource, a DL resource is separate, in time domain and frequency domain, from any UL resource in any symbol in the one serving cell, and wherein the second configuration and the third configuration are included in a configuration that is different from a UL and DL configuration in time division duplexing (TDD).

5. A system comprising a terminal and a base station, wherein the base station comprises a transmitter that transmits:

a first configuration of a first time resource of a downlink (DL) resource and an uplink (UL) resource, the DL resource and the UL resource being configured to overlap in a same symbol in one serving cell, a second configuration of a frequency of the DL resource, and a third configuration of a frequency of the UL resource; and the terminal comprises:

a receiver that receives the first configuration, the second configuration, and the third configuration; and a processor that controls, based on the first configuration, the second configuration, and the third configuration, at least one of reception of a DL signal in the DL resource and transmission of a UL signal in the UL resource, wherein the processor controls to receive the DL signal in the first time resource and controls to transmit a UL channel over a second time resource in the one serving cell, wherein, during the second time resource, a DL resource is separate, in time domain and frequency domain, from any UL resource in any symbol in the one serving cell, and wherein the second configuration and the third configuration are included in a configuration that is different from a UL and DL configuration in time division duplexing (TDD).

* * * * *